United States Patent [19]
Schumacher et al.

[11] Patent Number: 5,820,076
[45] Date of Patent: Oct. 13, 1998

[54] LUGGAGE COMPARTMENT SYSTEM ESPECIALLY FOR A PASSENGER AIRCRAFT CABIN

[75] Inventors: Markus Schumacher; Andrew Muin, both of Buxtehude, Germany

[73] Assignee: Daimler-Benz Aerospace Airbus GmbH, Hamburg, Germany

[21] Appl. No.: 742,459

[22] Filed: Nov. 1, 1996

[30] Foreign Application Priority Data

Nov. 3, 1995 [DE] Germany .......................... 195 40 929.9

[51] Int. Cl.$^6$ .............................. B64D 11/00; A47F 5/08
[52] U.S. Cl. ........................ 244/118.5; 312/246; 312/247
[58] Field of Search ............................ 248/320; 312/242, 312/248, 247, 249.7, 246; 244/118.5, 118.1

[56] References Cited

U.S. PATENT DOCUMENTS

| | | | |
|---|---|---|---|
| 4,285,557 | 8/1981 | Paladino et al. ..................... | 312/248 X |
| 4,979,785 | 12/1990 | Richards .............................. | 312/242 X |
| 5,011,239 | 4/1991 | Guerin .................................... | 312/248 |
| 5,129,597 | 7/1992 | Manthey et al. ..................... | 244/118.5 |
| 5,244,269 | 9/1993 | Harriehausen et al. . | |
| 5,314,143 | 5/1994 | Luria .................................... | 244/118.1 |
| 5,395,074 | 3/1995 | Hart et al. ............................. | 244/118.1 |
| 5,395,075 | 3/1995 | Sprenger et al. ..................... | 244/118.5 |
| 5,441,218 | 8/1995 | Mueller et al. ....................... | 312/248 X |
| 5,456,529 | 10/1995 | Cheung ................................. | 312/248 X |
| 5,567,028 | 10/1996 | Lutovsky et al. ...................... | 312/246 |

*Primary Examiner*—Peter M. Cuomo
*Assistant Examiner*—David E. Allred
*Attorney, Agent, or Firm*—W. F. Fasse; W. G. Fasse

[57] ABSTRACT

A luggage compartment system for a passenger cabin, especially for commercial airliners, is equipped with compartment units each formed by at least two compartments interconnected or coupled through a coupling, guide and drive mechanism (13) for moving the compartments of a unit from a closed upper position to an open lower position and vice versa. Each unit has a large compartment and a small compartment, the latter is intended for smaller luggage items, including fragile items, while the larger compartment is intended for large luggage including suitcases. In the closed position the two compartments of a unit are arranged next to each other in a direction extending crosswise to a longitudinal central vertical plane (10) through the aircraft cabin. The compartments have for their bottom contoured panels that are integrated into the ceiling of the cabin in the closed compartment position. The coupling, guide and drive mechanism (13) moves both compartments of a unit either up or down, whereby the compartments in their down position are located just above the passenger seats for loading and unloading with the smaller compartment being positioned above the larger compartment. Openings in the compartments face the central plane.

18 Claims, 6 Drawing Sheets

LUGGAGE COMPARTMENT SYSTEM ESPECIALLY FOR A PASSENGER AIRCRAFT CABIN

FIELD OF THE INVENTION

The invention relates to luggage compartment systems for a passenger cabin especially in commercial passenger aircraft. Such luggage compartment systems comprise luggage compartments that are movable with the help of a guide and drive mechanism from a closed transport position to an open loading and unloading position and back again into the closed position.

BACKGROUND INFORMATION

It is customary in passenger aircraft to permit passengers to take only so-called hand luggage or carry-on luggage into the passenger cabin of a commercial airliner. Such a requirement is due to the fact that the storage space in the form of luggage compartments inside the cabin has only a limited capacity. Efforts have been made to increase the available luggage space. German Patent Publication DE 4,130,644 C2 (Harriehausen et al.), corresponding to U.S. Pat. No. 5,244,269 (Harriehausen et al.); issued on Sep. 14, 1993, discloses luggage storage devices in an aircraft cabin equipped with lowerable shells each forming a luggage compartment. These lowerable shells bring the compartment into a very convenient reach of the passengers, but are not constructed for large luggage pieces.

Larger luggage pieces are currently being stored in the freight compartment of an aircraft. However, this requirement has a tendency that the number of carry-on luggage pieces increases because passengers are less willing to check-in their luggage. There are several reasons for this tendency, too often the luggage does not arrive with the plane a passenger took. Another reason for taking as much luggage as possible on-board the aircraft is the fact that the carry-on luggage pieces are more readily accessible to the passenger during the flight. Moreover, time can be saved by using only carry-on luggage because the check-in time and the check-out time for the larger luggage pieces increase the total travel time including the waiting times when passengers must wait in line for either check-in or checkout. Passenger airlines do not mind this trend because it relieves the logistic facilities of an airline by reducing the costs for the loading and unloading of the aircraft. However, there is room for improvement with regard to the available luggage storage space in a cabin of a passenger aircraft.

OBJECTS OF THE INVENTION

In view of the above it is the aim of the invention to achieve the following objects singly or in combination:

to optimally use the available space in an aircraft body especially near and above the ceiling to provide sufficiently large luggage storage compartments that are still conveniently manageable by the passenger;

to provide different size luggage compartments for separate storage of different size luggage items such as suitcases, brief cases, purses, and the like, including garment items and fragile items that may be contained in carry-on luggage;

to construct such different size luggage compartments in such a way that they do not unnecessarily limit the space needed for passengers to move in the cabin and so that these luggage compartments do not interfere with the spacious impression provided in large bodied passenger aircraft;

adapting the size of different luggage compartments to the size of different luggage pieces and to arrange these different size compartments in such a way that their loading and unloading is facilitated particularly with regard to the weight of the various size luggage items;

to integrate various size luggage compartments into the aircraft body contour, especially the cabin ceiling contour, so that these compartments do not interfere with the normal ceiling contours nor with the positioning of the cabin lighting fixtures and other passenger convenience components such as fresh air supplies and so forth; and to provide a motor operated guide, coupling and drive mechanism for raising and lowering each unit of luggage compartments to a raised storage position and a lowered loading or unloading position.

SUMMARY OF THE INVENTION

The above objects have been achieved according to the invention in that each luggage compartment unit comprises at least two compartments arranged relative to each other in such a way that in the closed state of the two compartments of a unit these compartments are in a next to each other position and extend in a direction crosswise in the ceiling area of the passenger cabin relative to the length of the aircraft. Preferably, the bottoms of the luggage compartments form at least a portion of the ceiling contour of the passenger cabin. Further, both compartments of a unit are coupled by a guide and drive system in such a way that in the lowered, loading position of the compartments, these compartments are located in an above each other position above the passenger seats in such a way that an opening for insertion and removal of luggage items faces the aisle in the aircraft cabin. These openings do not need doors.

It is a special advantage of the invention that even larger luggage items, such as a suitcase can be taken on-board as a carry-on item. Furthermore, it is now possible to place large luggage items, such as suitcases, pilot cases, and large brief cases into the large compartments while placing purses and other luggage items holding, for example fragile items into the smaller compartments so that these fragile items are protected against crushing or other damage by large luggage items. The same applies to clothing items. Further, in a preferred embodiment the units are integrated into the ceiling contour, whereby the spacious impression of large bodied passenger aircraft cabins is maintained and the space permitting movement of the passengers in the cabin is not unnecessarily restricted. Preferably, each unit comprises a large luggage compartment and a small luggage compartment.

The arrangement of the compartments forming a unit relative to each other within the unit is such that in the recessed next to other position these luggage compartment units merge into the ceiling contour so that these compartments are hardly visible and a substantially horizontal ceiling contour is maintained. The guided raising and lowering of the compartments in combination with a power drive and guide makes it possible in one embodiment to position the larger compartment below the smaller compartment and vice versa in another embodiment, depending on requirements. It may be preferable to place the larger compartment in the lowered open compartment position below the smaller compartment and as low as possible to facilitate the loading and unloading of heavier luggage items.

By avoiding compartment doors, the content of the compartments in the lowered one above the other position, is readily visible so that luggage items can be placed to avoid squeezing luggage items in the raised, recessed, next to each other position of the compartments.

The guide and drive mechanism which also performs a coupling function in the present luggage compartment system is so positioned and constructed that it is easily realized and that it can be operated by the passengers.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
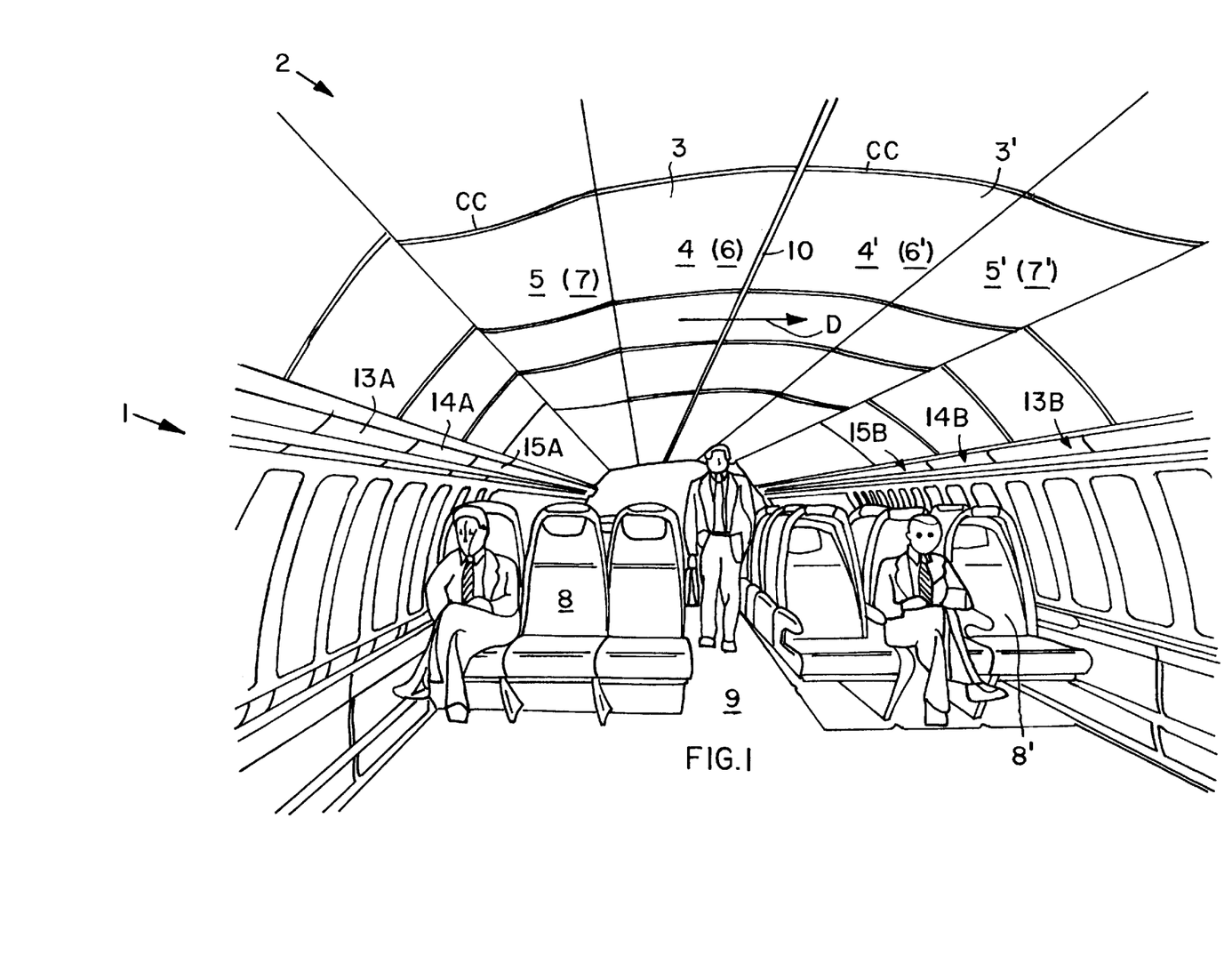
FIG. 1 illustrates a view axially toward the rear into an aircraft cabin in which the closed luggage compartments of the invention are integrated into the ceiling contour.
Figure 3:
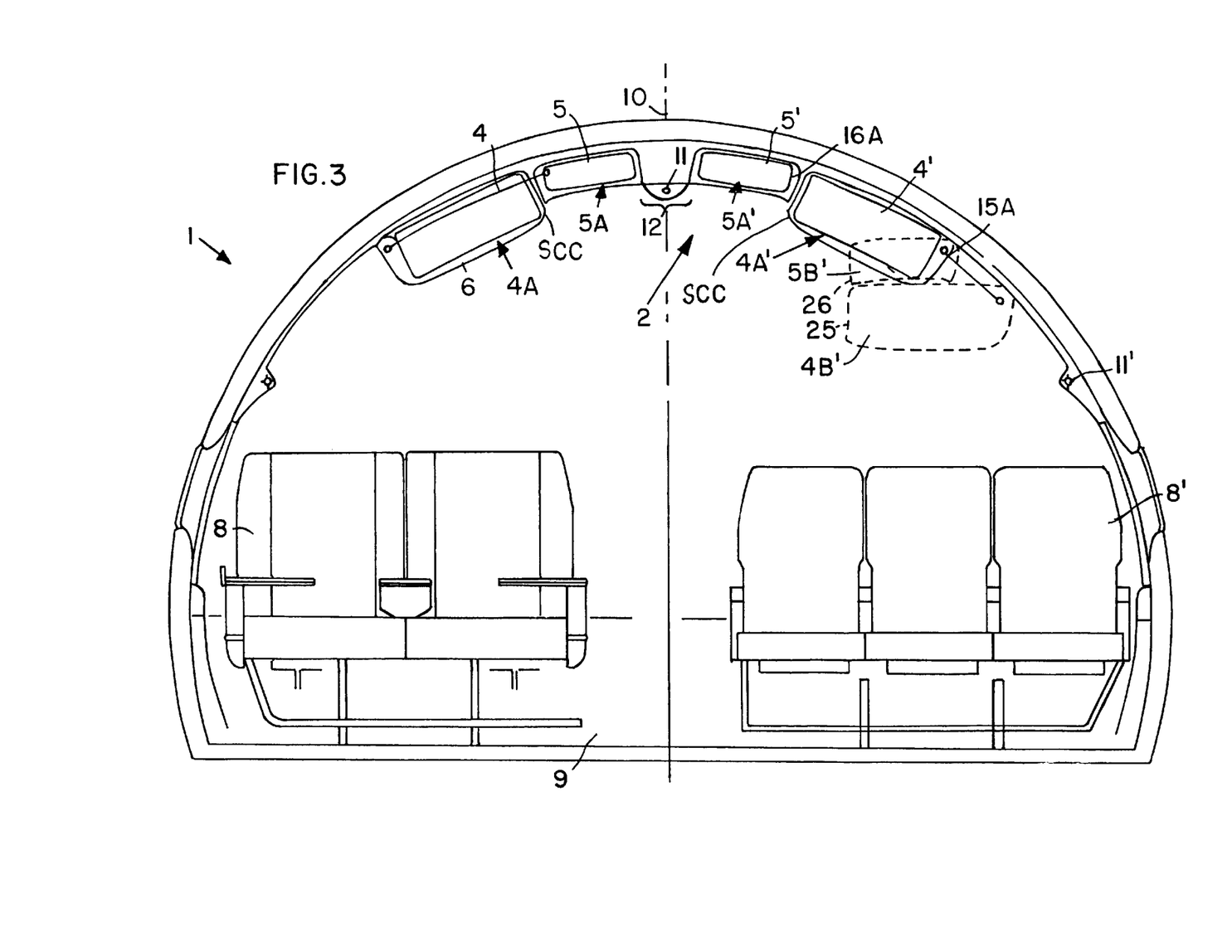
FIG. 3 is a view similar to that of FIG. 2, however showing a second embodiment in which the larger compartment of a unit is positioned further away from the central, vertical, longitudinal plane through the cabin while the smaller compartment of a unit is positioned closer to the central plane.
Figure 4:
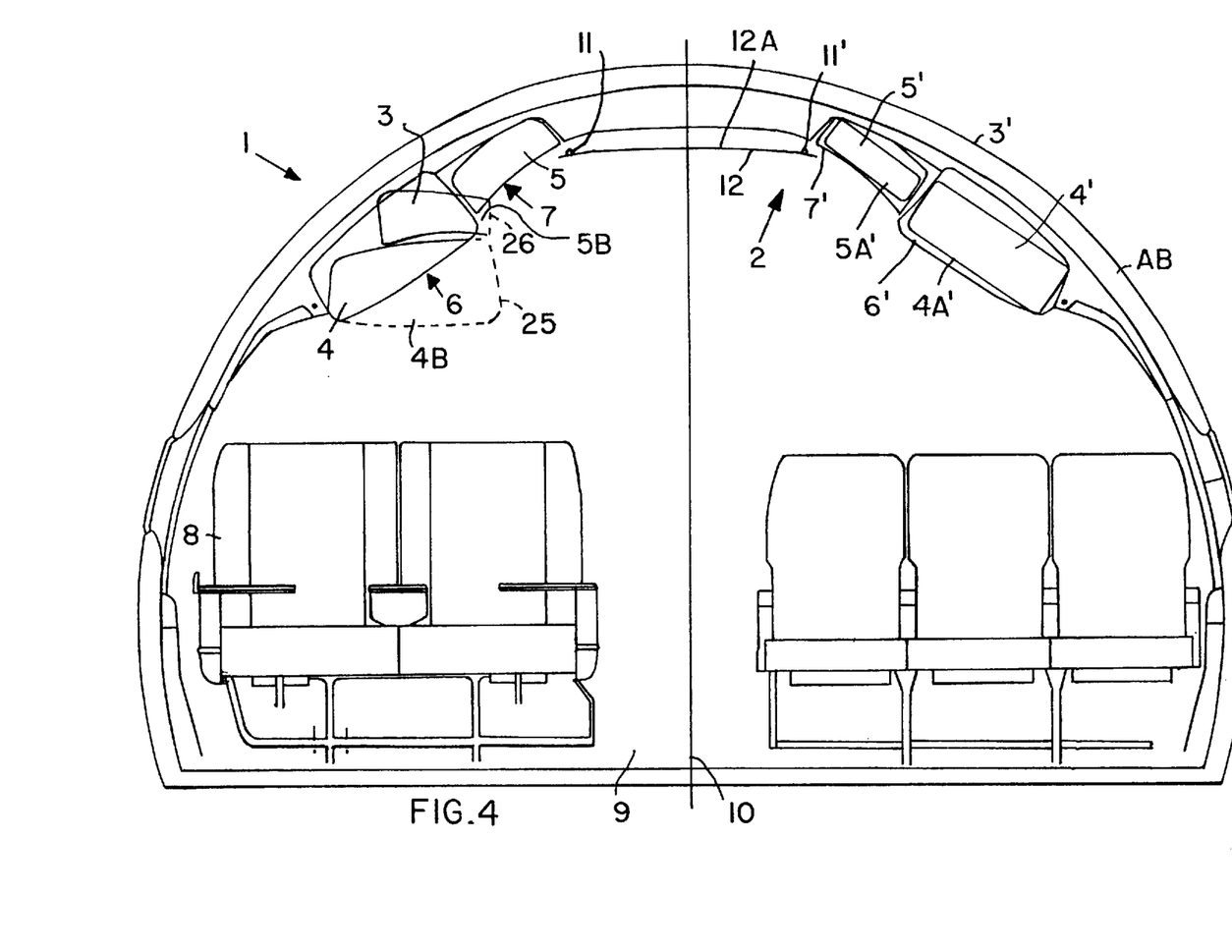
FIG. 4 shows a third embodiment in which a central ceiling cover panel is positioned between the right and left luggage compartment units.

FIG. 1 shows a passenger cabin 1 of an aircraft in a perspective view. A ceiling area 2 of the cabin 1 is equipped with luggage compartment units 3 and 3'. Reference numbers without a prime generally relate to the left side of the cabin, while reference numbers with a prime relate to the right side of the cabin, as viewed in the longitudinal axial direction toward the rear of the aircraft. As best seen in FIGS. 3 and 4, the luggage compartments are arranged mirror-symmetrically relative to a central vertical cabin plane 10 extending longitudinally through the aircraft. Each luggage compartment unit 3, 3' comprises, for example two individual compartments 4, 5 and 4', 5' respectively. Bottom plates 6 and 7 of the compartments 4 and 5 respectively and bottom plates 6', 7' of the compartments 4', 5' respectively are contoured so as to match into the ceiling contour CC so that the bottoms 6, 7 and 6' and 7' are integrated into the ceiling contours along the length of the passenger cabin. Thus, when the luggage compartments 4, 5 and 4', 5' are recessed or raised, they are not recognizable as such and the bottoms 6, 7 and 6', 7' are configured to match into the cabin inner ceiling paneling. This type of arrangement provides a relatively spacious room impression of the entire cabin and the present luggage compartments do not diminish that impression. It is desirable that the ceiling conveys a substantially horizontal orientation as well as a wide ceiling contour in the direction crosswise to the central, vertical, longitudinal cabin plane 10 and that contour hides the luggage compartments.

Conventional luggage compartments are arranged in one longitudinal row above the passenger seats 8, 8'. Contrary thereto, according to the invention the two compartments 4 and 5 of a unit 3 and the compartments 4' and 5' of a unit 3' are arranged side-by-side or in a next to each other position 4A, 5A in a direction D crosswise to the longitudinal, central, vertical plane 10. In the just described present construction the luggage compartments in their closed or rather not accessible normally raised position disappear behind the ceiling. However, in order to reach the lowered one above the other position 4B, 5B shown in FIG. 2, the compartments 4 and 5 travel downwardly and laterally outwardly into space above the passenger seats 8, 8' so that the two compartments 4, 5 of a unit 3 will be positioned one above the other and above the passenger seats for convenient loading and unloading access by a passenger standing in an aisle 9. This applies to both sides to the right and left of the central cabin plane 10.

Figure 2:
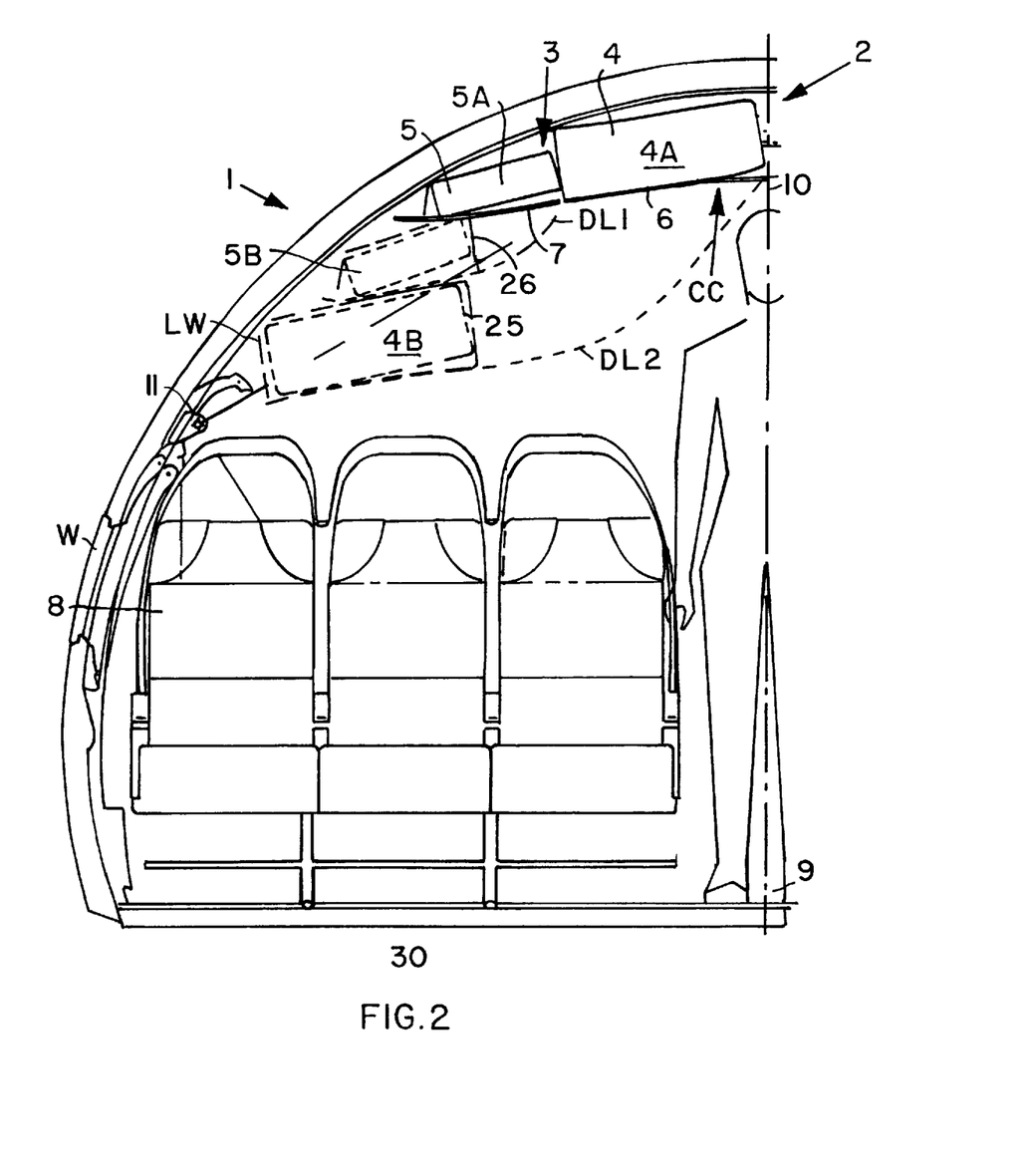
FIG. 2 is a partial section through an aircraft passenger cabin showing a first embodiment of a luggage compartment unit of the invention shown in full lines in the upper recessed next to each other position in which a larger compartment is positioned closer to a vertical, longitudinal, central plane of the cabin than a smaller compartment, and in dashed lines in the lowered loading or unloading above each other position.

FIG. 2 shows in dashed lines the open position 4B and 5B of the luggage compartments 4 and 5 while showing the closed or recessed position 4A and 5A in full lines. Further, dashed line DL1 shows the motion path of the smaller compartment 5 from one position 5A into the other position 5B or vice versa. Dashed line DL2 shows the respective motion path for the larger compartment 4 from one position 4A to the other position 4B or vice versa. In the full line closed position the embodiment of FIG. 2 places the larger compartment 4 closer to the central cabin plane 10 while the smaller compartment 5 is positioned further away from the central cabin plane 10. In this embodiment the larger compartment 4 reaches substantially all the way to the central cabin plane 10 whereby the space above the ceiling is most efficiently used. In order to permit such positioning of the compartments 4 and 5 of a unit 3, the light fixtures 11 which conventionally are mounted in the ceiling area 2, are laterally displaced according to the invention into an area between the window W and the left wall LW of the larger compartment 4 in its lowered position 4B. Thus, the lighting fixtures 11 are positioned approximately in the head area of the passengers, thereby providing a more efficient light distribution with regard to the passengers' convenience. The area just mentioned between the window W and the wall LW permits a substantial freedom of positioning the light fixtures. Thus, these fixtures 11 may also be positioned below the eye level of a person standing in the aisle 9 and the required light distribution may be achieved by using light guide grids or lamellae which as such are conventional.

As seen in FIG. 2, the compartments 4 and 5 of the unit 3 have different sizes. Specifically, compartment 4 is referred to as a large luggage compartment that can hold larger luggage pieces including a suitcase. Compartment 5 is referred to as a small luggage compartment for holding small items of luggage and clothing. Thus, it is possible to keep fragile or sensitive luggage items and clothing away from the heavier and larger luggage items, whereby the items in the smaller compartment 5 are protected from the larger luggage items against squeezing, damage, and soiling. With the arrangement of the large luggage compartment 4 closer to the central cabin plane 10 and the small compartment 5 laterally outwardly from the compartment 4 and further away from the central cabin plane 10 it is especially convenient to conform the bottoms 6 and 7 of these compartments 4, 5 to the ceiling contour CC which thus hides the compartments 4 and 5 in their recessed next to each other position. This arrangement also covers up the curved contour of the aircraft body so that a substantially horizontal and wide ceiling contour is made possible within the passenger cabin when the compartments are in the normally closed next to each other positions 4A, 5A.

In the lowered positions 4B, 5B above the seats 8 below the lateral cabin ceiling, these compartments 4 and 5 are positioned one above the other so that their open sides 25, 26 are open toward an aisle 9 for convenient access. A coupling, guide and drive mechanism 13 shown in FIGS. 5 and 6 to be described in more detail below, is arranged laterally near the end walls of both compartments of a unit 3. The two compartments 4, 5 or 4', 5' of a unit 3, 3' are positively coupled with each other and their motions from their normally recessed position into their lowered access position and vice versa takes place in synchronism or unison with the appropriate motion phases for each compartment. In the embodiment shown in FIG. 2, the large compartment 4 in its lower position 4B is located below the small compartment 5 in its lower position 5B. This arrangement facilitates the loading and unloading of large luggage items into the large compartment 4 in its lower position 4B because the lifting or lowering height of larger luggage items is reduced.

FIG. 3 shows a second embodiment of the invention, whereby all compartments shown in the full line are illustrated in their upper recessed next to each other positions 4A, 5A, 4A', and 5A'. However, in this second embodiment the smaller compartments 5 and 5' are positioned closer to the central plane 10 than the larger compartments 4 and 4'. FIG. 3 also shows on the right-hand side in dashed lines the lowered positions 4B' and 5B' of the respective compartments, whereby, as in the first embodiment of FIG. 2, the smaller compartment 5' is positioned at 5B' above the larger compartment 4' in its lower position 4B'. The coupling, guiding and drive mechanism in the embodiment of FIG. 3 is substantially the same as the one used in the embodiment of FIG. 2. Merely the respective displacement distances of the compartments between their raised and lowered positions is changed compared to the embodiment of FIG. 2. Further, in FIG. 3 a space 12 between the compartments 5 and 5' in the ceiling area is used for installing the lighting fixtures 11. The positioning of the small compartments 5 and 5' closer to the central cabin plane 10 and the large compartments 4 and 4' further away from the central plane 10 results in a stepped ceiling configuration SCC compared to the wide ceiling configuration or contour CC shown in FIG. 2.

The lowering of the compartments 4 and 5 into the open positions 4B', 5B' takes place in parallel to the ceiling or side wall curvature and hence also along a curvature of the aircraft body under the guidance of the above mentioned coupling, guide and drive mechanism 13, whereby the large compartment 4' assumes a lowered position 4B' below the small compartment 5' in its lowered position 5B'. The motion of the compartments includes a linear downward or upward motion component in addition to a tilting motion component about a tilting axis 15A, 16A into a horizontal position in order to present the open compartment sides 25, 26 to the passengers for an optimal access. The coupling guide and drive mechanism 13 for the embodiment of FIG. 3 is substantially the same as the one used in the embodiment of FIG. 2 and will be described in more detail below with reference to FIGS. 5 and 6.

FIG. 4 shows a third embodiment of the luggage compartment unit 3 similar to that of FIG. 3. However, in FIG. 4 the compartments 4 and 5 as well as 4' and 5' shown in full lines are integrated into the ceiling with due regard to the curvature of the aircraft body AB. On the left side the compartments 4 and 5 shown in full lines are illustrated in their closed recessed position while the dashed line illustration shows the lowered position 4B and 5B. On the right-hand side the compartments 4' and 5' are only shown in their upper recessed position 4A' and 5A'. This arrangement provides a wider free ceiling area 12A covered by a ceiling panel 12 which permits installation of e.g. two rows of lighting fixtures 11 and 11', for example behind the panel 12 that may be provided along its longitudinal edges with light diffusing grids or the like. In this embodiment it is possible to use the bottom plates 6, 7 and 6', 7' as light reflecting surfaces for the light coming from the fixtures 11 and 11'.

Figure 5:
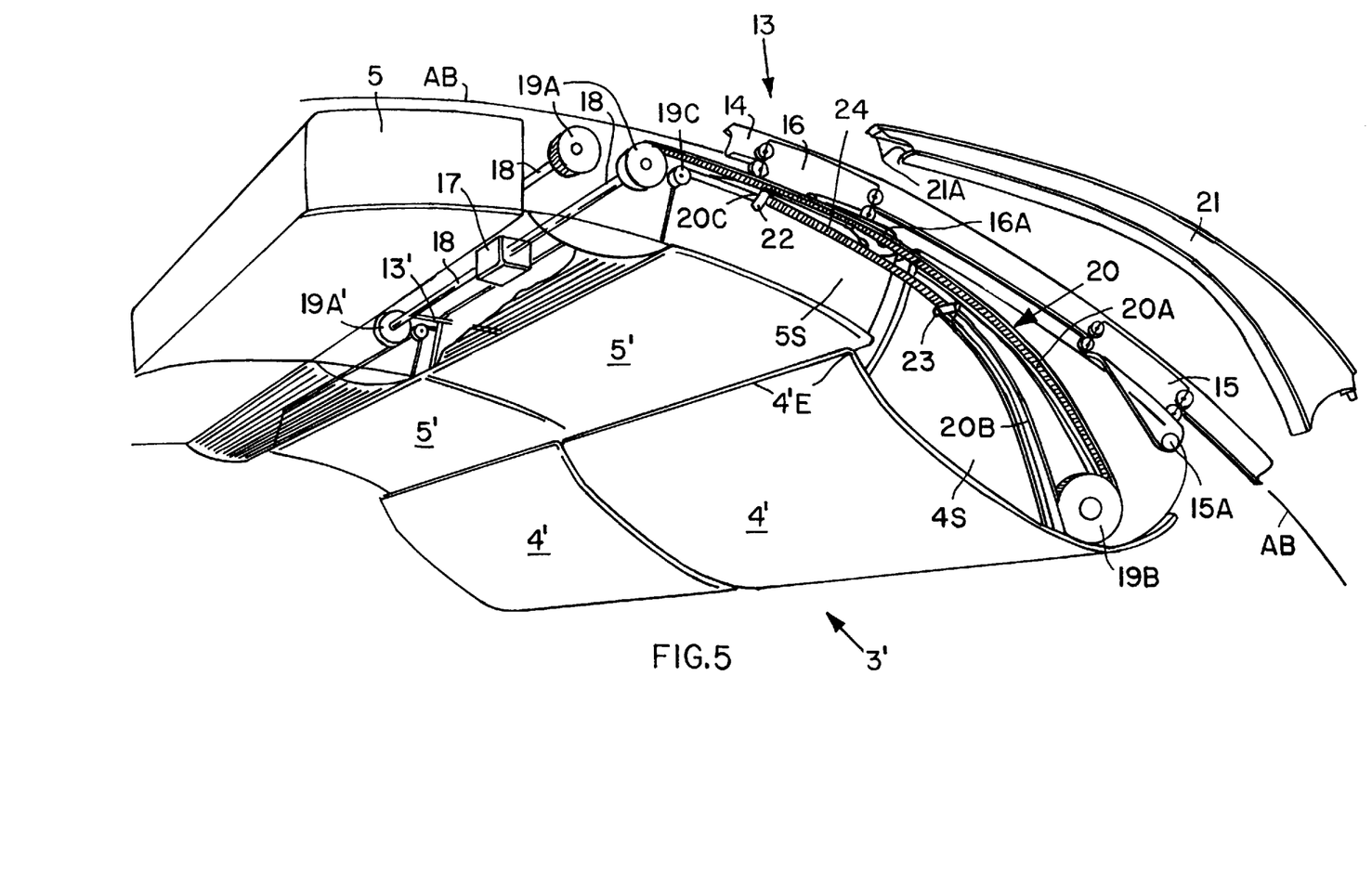
FIG. 5 is a perspective view of a guide and drive mechanism that couples for example two compartments together to form a unit, whereby the compartments are shown in their recessed closed position.
Figure 6:
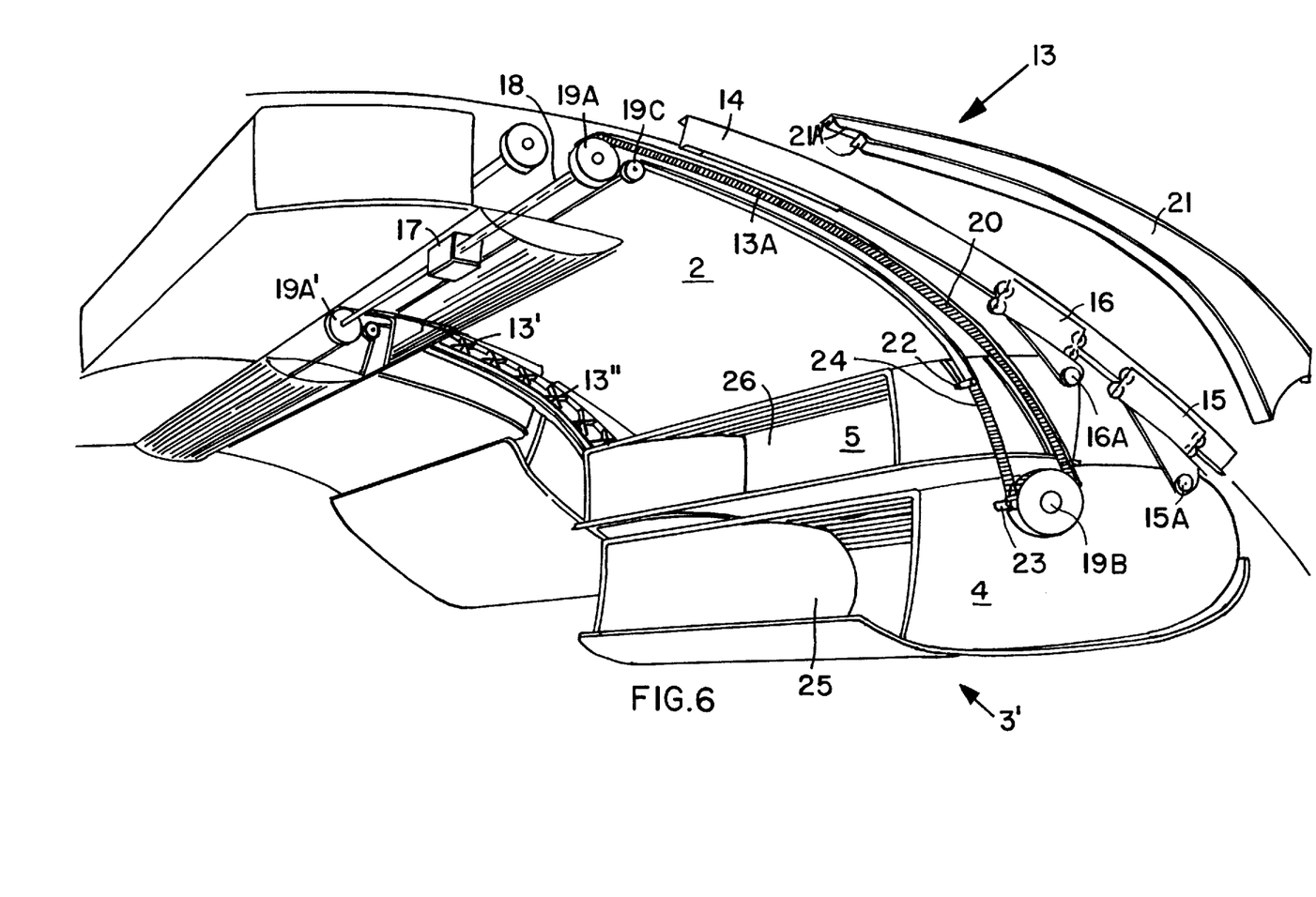
FIG. 6 is a view similar to that of FIG. 5, however showing the compartments in their open and lowered position ready for loading or unloading.

FIGS. 5 and 6 illustrate the coupling guide and drive mechanism 13 for lowering and raising the compartments 4', 5' of FIGS. 3 and 4. Two such mechanisms 13 and 13' are provided each side of a compartment unit on each side of the central cabin plane 10. FIG. 5 shows the raised condition of the compartments while FIG. 6 shows the lowered condition of the compartments. The components of the mechanism 13 are positioned along side walls 4S of the compartment 4' and 5S of the compartment 5'. A guide rail 14 is secured to the aircraft body AB and conforms with its curvature to the contour of the aircraft body AB. A guide carriage 15 for the large compartment 4' and a guide carriage 16 for the small compartment 5' run along the guide rail 14. The guide carriages 15 and 16 are secured by at least one tilting or journal axis 15A and 16A to the respective compartment 4', 5'. A motor 17, for example an electric or a pneumatic motor is used for the raising and lowering of the compartments of a unit 3, 3'. In this example an electric motor 17 drives two shafts 18 each having rigidly secured thereto a drive wheel 19A and 19A' driven by transmission elements such as gear belts 20 or sprocket chains. Thus, the wheels 19A and 19A' would be either gear wheels or sprockets wheels. The wheels 19A, 19A' are rigidly secured to the motor shafts 18 and the motor 17 is secured to the body AB or to the ceiling structure. The gear belt 20 moves with its upper run 20A and with its lower run 20B inside a cover 21 provided with guide tracks 21A, for the upper and lower belt runs. A tensioning and guide roller 19C is rotatably mounted in the guide cover 21. Preferably, but not necessarily, the roller 19C is spring biased to assure an adequate tension of the belt 20 at all times. Due to the connection of the motor 17 through the shafts 18 to the transmission components on both sides of a unit 3, 3', the kinematic coupling of the two compartments 4' and 5' of a unit is assured and the synchronous lowering and raising of the compartments of the respective unit 3, 3' is positively enforced. "Synchronous" here means controlled motion phases that take place either simultaneously or in a controlled sequence.

The gear belt 20 with its upper run 20A and its lower run 20B is fully covered by a guide cover 21 to avoid accidents. The guide cover has grooves 21A which determine the path and motion direction of the compartments 4', 5' on their way up or down. The cover 21 is rigidly secured to the aircraft body AB. However, in FIGS. 5 and 6 the cover 21 is shown lifted off the gear belt 20 to make the coupling, drive and guide mechanism 13 visible for illustration. A guide wheel 19B for the belt 20 is mounted for rotation in the cover 21 and not to the side wall of any compartment. The drive motor 17 is controllable by a switch not shown, preferably a pressure operated switch positioned in reaching distance in the area of the seats 8, 8' next to the aisle 9.

To cause a downward motion, the motor 17 will drive the gear wheels 19A and 19A' and hence the belt 20 also counterclockwise thereby lowering the compartments 4', 5' as follows. The gear belt 20 is guided around the guide wheel 19B and tensioned by the guide roller 19C. The guide mechanism 13 is preferably provided at each end of a unit 3, 3'. However, the other wheels at the other end of the compartment are not visible in FIGS. 5 and 6. The guide roller 19C is preferably mounted so that its position is adjustable for tensioning the belt 20. One point 20C of the gear belt 20 is rigidly connected to a pin 22 which itself is rigidly connected to the side wall 5S of the compartment 5'. The pin 22 is connected to one end of a compression spacer spring 24 functioning as a spacer and entraining element. The other end of the spring 24 is connected to a further pin 23 which itself is rigidly secured to the side wall 4S of the compartment 4'. A relative motion between the gear belt 20 and the pin 23 is limited by the spring 24 and entraining elements on the gear belt 20 as well as stop elements within the respective guide track 21A in the cover 21 for the coupling, drive and guide mechanism 13.

When the compartments are moved downwardly, the pin 22 rigidly connected to the compartment 5' is guided with the lower run 20B of the gear belt 20 along the lower guide track 21A in the gear belt cover 21. The spacer spring 24 is preferably a helical spring that envelopes the gear belt 20. In other words the gear belt 20 passes through the spring 24. When the spring becomes shorter because it is compressed, the belt 20 does not slacken because any slack is taken up by the guide and tensioning roller 19C. As the pin 22 moves downwardly driven by the counterclockwise rotation of the belt 20 the spring 24 transmits this motion to the pin 23 and thus to the compartment 4'. The pin 23 also moves along the lower guide track 21A in the gear belt cover 21. However, the pin 23 can, as mentioned, move relative to the belt 20, while the force transmission takes place through the spacer spring 24. In addition to the downward motion phase of the compartments 4', 5' there is also a tilting motion phase as the compartments tilt about the axes 15A and 16A respectively to assume a substantially horizontal orientation in the one above the other lowered position for access through the loading and unloading opening facing the central cabin plane 10 shown in FIG. 3, whereby the access openings 25 and 26 to the compartments 4' and 5' are in a position for easy access to load or unload.

The tilting axes 15A and 16A travel along the guide rail 14 with their guide carriages 15 and 16, respectively. The final substantially horizontal position of the compartments at the end of the downward movement of the pins 22, 23 is reached when the pin 23 contacts a stop not shown but provided within the respective, lower guide track 21A of the cover 21. Thus, the large compartment 4' is now in its end position. The pin 22 keeps still moving due to the motion of the gear belt 20 until a further stop not shown, but provided in the lower guide track 21A of the cover 21, is contacted by the stop pin 22. The spacer spring 24 is compressed in this condition to store energy that will facilitate the upward movement of the compartments. The drive of the gear belt 20 is switched off at this point, preferably by an end position response switch.

In order to raise the compartments of the unit 3' again, the drive motor 17 is activated, for example, by a manual electrical switch to now drive the gear belt 20 clockwise. The pin 22 is pulled upwardly by the gear belt 20 and thus guides the small compartment 5' upwardly toward the ceiling in cabin 1 to assume the closed position shown in FIG. 5. Even in the closed or recessed position the loading and unloading openings of the luggage compartments substantially face the central cabin plane 10. The holding pin 23 travelling in the lower guide track 21A guides the compartment 4' toward the ceiling into the closed position with a motion delay defined by the characteristic of the spring 24. The minimum spacing between the pins or bolts 22 and 23 is determined by an entraining member on the gear belt 20 which takes along or entrains the pin 22 or the defined spacing can be achieved by the length of an envelope (not shown) of a defined length around the spring 24. The envelope will bear against pins 22 and 23 in the stop position. The closed position for the compartment 4', 5' is achieved when the pin 22 contacts a stop in the guide track 21A of the cover 21 and the entire unit 3 is now in the closed position shown in FIG. 5.

The compartments 4, 5 and 4', 5' are constructed as closed boxes each having an opening 25, 26 facing the loading and unloading side. Doors are obviated by the present construction because in the recessed position behind the ceiling, these openings 25, 26 are not seen. Thus, it is assured that the boxes are not overfilled and the squeezing of the luggage in the compartment is avoided when a compartment is manually closed. Further, a closed box with only one open wall has an improved strength or stiffness.

In FIG. 3 both compartments of a pair 4, 5; 4', 5' move downwardly and tilt clockwise on the left side of the central cabin plane 10 and counterclockwise on the right side of the central cabin plane 10 to assume the dashed line accessible lowered position. An upward movement combined with a respective tilting in the opposite directions brings the compartments into the recessed position. These motions and their path are determined by the configurations of the above mentioned guide tracks 14, 21A.

Similarly, in FIG. 2 the compartments perform motions along paths DL1 and DL2 respectively, whereby the larger compartment 4 must overtake the smaller compartment 5 to reach its destinations 4A or 4B.

In FIG. 4, the motions downward plus tilting or upward plus tilting are substantially the same as in FIG. 3 except that in FIG. 3 the length of the downward motion is longer than in FIG. 4, because in FIG. 3 the compartments in their recessed location are positioned relative to the cabin floor, higher than in FIG. 4. This is so because in FIG. 3 both compartments are positioned closer to the central cabin plane 10 than in FIG. 4. Hence, the travel path length in FIG. 4 is shorter than in FIG. 3.

Although the invention has been described with reference to specific example embodiments, it will be appreciated that it is intended to cover all modifications and equivalents within the scope of the appended claims.

What is claimed is:

1. An aircraft cabin comprising a vertical central longitudinal cabin plane (10), a luggage compartment system for passengers, said luggage compartment system including at least one compartment unit (3 or 3'), each compartment unit comprising at least two compartments (4, 5, or 4', 5') arranged in a normally raised next to each other closed position so that said two compartments extend in a direction cross-wise to said vertical central longitudinal cabin plane (10) through said aircraft cabin, whereby said two compartments are not accessible in said raised position, each compartment comprising a loading and unloading opening facing said central cabin plane, and a guide and drive mechanism (13) coupling said at least two compartments to each other for lowering said at least two compartments from said normally raised next to each other position into a lowered one above the other open position so that said loading and unloading opening of each of said at least two compartments faces said central cabin plane (10) of said passenger cabin, and for raising said at least two compartments into said next to each other closed position, wherein said guide and drive mechanism (13) comprises a guide rail (14) secured to said aircraft, at least one guide roller carriage (15, 16) connected to each respective compartment of said at least two compartments for rolling along said guide rail (14), a drive motor having a power output shaft (18), a power transmission (19A, 20) for transmitting power from said power output shaft (18) to said at least two compartments for driving said compartments with said guide roller carriages (15, 16) back and forth between said raised next to each other position and said lowered one above the other position.

2. The system of claim 1, wherein said aircraft cabin has a contoured ceiling, said at least two compartments comprising bottom walls forming panels contoured to match said contoured cabin ceiling of said aircraft cabin in said next to each other raised position.

3. The system of claim 2, wherein one bottom wall panel of said bottom wall panels of said at least two compartments has an edge (4'E) that overlaps an edge of the other bottom wall panel when said two compartments are in said raised next to each other position.

4. The system of claim 1, wherein said at least one compartment unit comprises compartments of different sizes, including at least one larger volume compartment and at least one smaller volume compartment compared to said larger volume compartment, said compartments forming a pair in which the smaller compartment and the larger compartment complement each other to form said compartment unit.

5. The system of claim 4, wherein said smaller volume compartment is positioned closer to said central cabin plane (10) than said larger volume compartment when said at least two compartments are in said raised next to each other position so that said larger volume compartment is closer to a cabin side wall.

6. The system of claim 1, comprising at least two compartment units (3 and 3') arranged mirror-symmetrically opposite each other on opposite sides of said central cabin plane (10) with a spacing between said units (3 and 3'), and a ceiling cover area (12) in said spacing.

7. The system of claim 1, wherein said power transmission comprises a drive member (20) flexible in at least one plane, a drive wheel (19A) on said power output shaft (18), said drive member being driven by said drive motor (17) through said drive wheel (19A), said drive member (20) having a point (20C) operatively connected to one compartment of said compartment unit, and a spring (24) operatively connected between said point (20C) and the other compartment of said compartment unit, said spring (24) yielding elastically within a limited range for interconnecting said at least two compartments with each other through pins (22, 23), and at least one guide wheel (19B) rotatably mounted in a fixed position, said drive member (20) being drivable by said motor (17) and said drive wheel (19A) back and forth around said guide wheel (19B).

8. The system of claim 1, wherein said drive member (20) is a gear belt.

9. The system of claim 1, wherein said drive member (20) is a sprocket chain.

10. The system of claim 1, wherein said drive mechanism (13) comprises stop pins (22, 23) at least one of which is rigidly secured to each of said at least two compartments, said stop pin (22) being connected to said point (20C) of said drive member (20), wherein said pins (22, 23) interconnected by said elastic member (24) function as stop pins so that said at least two compartments are yieldingly interconnected.

11. The system of claim 10, further comprising a cover (21) for said drive mechanism (13), said cover having at least one guide track (21A) for said stop pins (22, 23), and wherein said at least one guide roller (19B) and said tensioning roller (19C) are rotatably mounted in said cover (21).

12. The system of claim 11, wherein said cover (21) comprises a truss-work (13").

13. The system of claim 10, wherein said elastic member (24) is a coiled spring (24) which is compressed between said stop pins (22, 23) when said at least two compartments move downwardly for storing auxiliary energy in said coiled spring (24) for moving said compartments upwardly.

14. The system of claim 1, further comprising a guide roller carriage (15, 16) for each compartment of a unit and journal bolts (15A, 16A) journalling said at least two compartments to a respective guide roller carriage of said guide roller carriages (15, 16).

15. The system of claim 1, wherein said drive member is a gear belt (20) rigidly connected to one compartment (5') through a first pin (22) rigidly connected to said one compartment, and wherein a compression spring (24) connected with one end to said pin (22) is further connected with the other spring end to a second pin (23) rigidly secured to the other compartment (4'), and wherein said second pin (23) is movable relative to said belt (20).

16. The system of claim 15, wherein said belt (20) passes through said spring (24) between said pins (22 and 23).

17. The system of claim 1, wherein said compartments (4, 5; 4', 5') have loading and unloading openings (25, 26) which are free of doors and face an aisle in the aircraft cabin at least in the lower one above the other compartment position.

18. An aircraft cabin comprising a vertical central longitudinal cabin plane (10), a luggage compartment system for passengers, said luggage compartment system including at least one compartment unit (3 or 3'), each compartment unit comprising at least two compartments (4, 5, or 4', 5') arranged in a normally raised next to each other position so that said two compartments extend in a direction cross-wise to said longitudinal, vertical, central cabin plane (10) through said aircraft cabin, whereby said two compartments are not accessible in said raised position, each compartment comprising a loading and unloading opening facing said cabin plane, and a guide and drive mechanism (13) coupling said at least two compartments to each other for lowering said at least two compartments from said normally raised next to each other position into a lowered one above the other open position so that said loading and unloading opening of each of said at least two compartments faces said central plane (10) of said passenger cabin, and for raising said at least two compartments into said next to each other closed position, wherein said at least one compartment unit comprises compartments of different sizes, including at least one larger volume compartment and at least one smaller volume compartment compared to said larger volume compartment, said compartments forming a pair in which the smaller compartment and the larger compartment complement each other to form said compartment unit, wherein said smaller volume compartment is positioned closer to said central cabin plane (10) than said larger volume compartment when said at least two compartments are in said raised next to each other position so that said larger volume compartment is closer to a cabin side wall.

* * * * *

UNITED STATES PATENT AND TRADEMARK OFFICE
CERTIFICATE OF CORRECTION

PATENT NO. : 5,820,076

DATED : Oct. 13, 1998

INVENTOR(S) : Schumacher et al.

It is certified that error appears in the above-identified patent and that said Letters Patent is hereby corrected as shown below:

Col. 6, line 17, after "provided" insert --one on--, after "unit" replace "on each side of the" by --.-- ;

line 18, before "Fig. 5" delete "central cabin plane 10.";

line 33, after "by" insert --drive--.

Signed and Sealed this

Ninth Day of February, 1999

Attest:

Attesting Officer

*Acting Commissioner of Patents and Trademarks*